J. D. INGRAM.
WHEEL TREAD.
APPLICATION FILED NOV. 3, 1919.
1,372,951.
Patented Mar. 29, 1921.
2 SHEETS—SHEET 2.
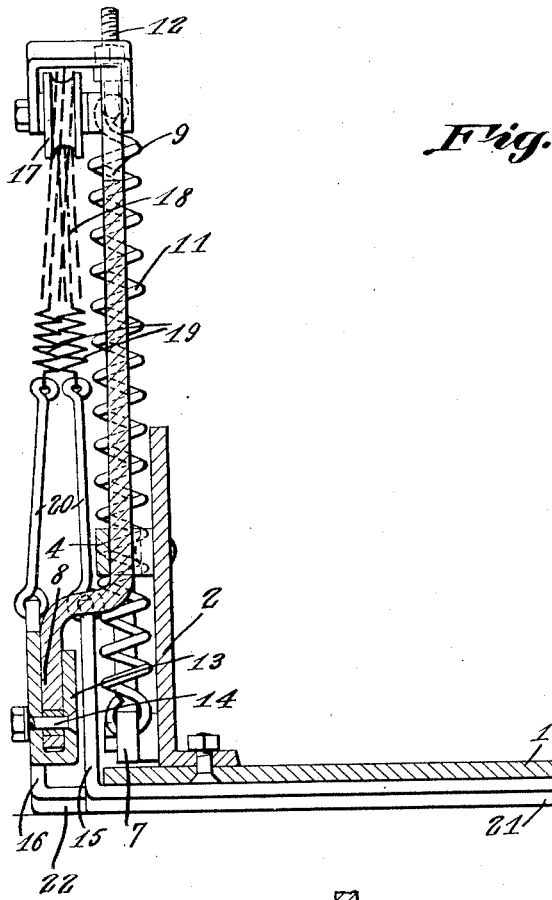
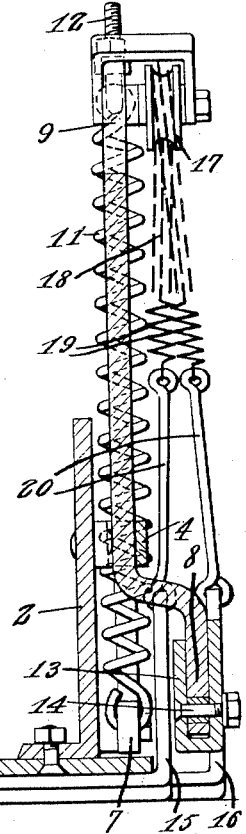
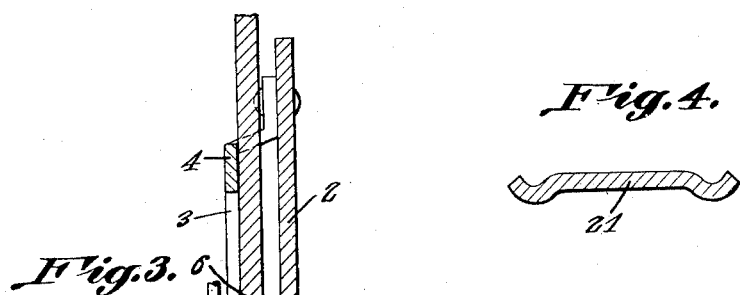
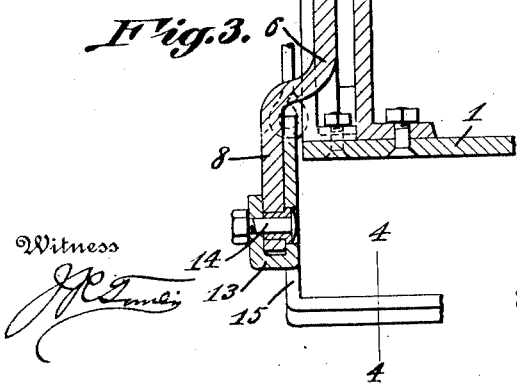
J. D. Ingram, Inventor
By C. A. Snow & Co.
Attorneys

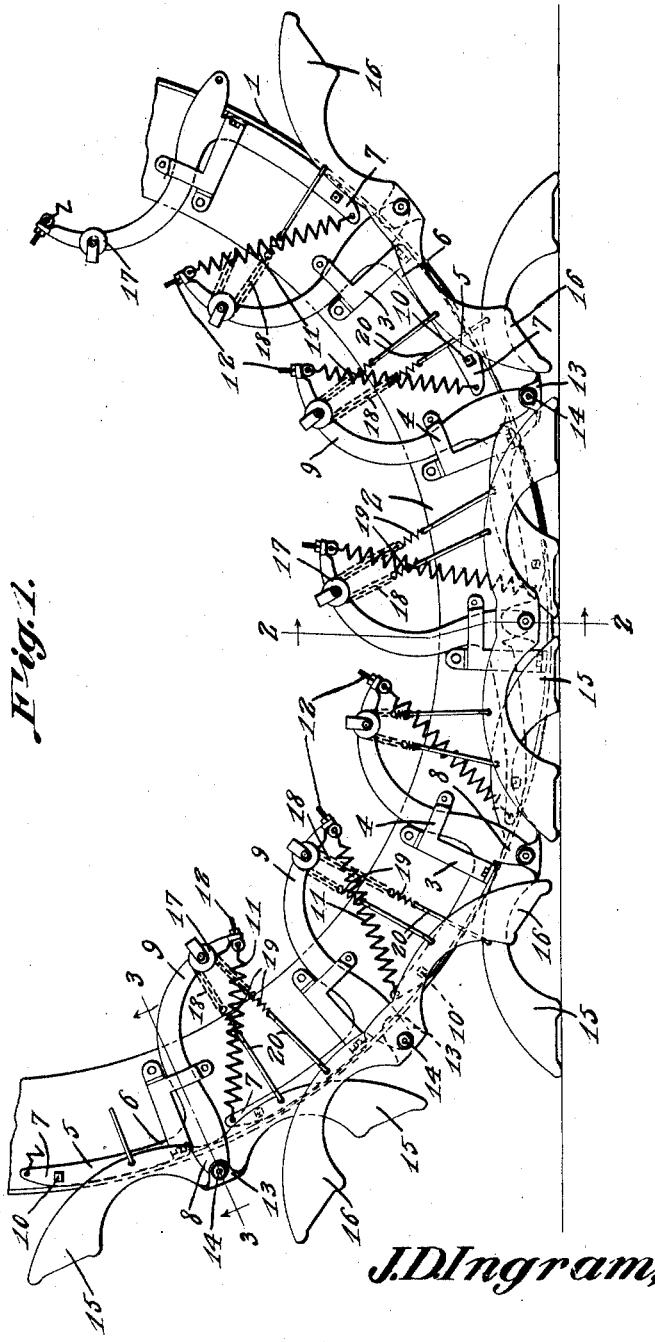

UNITED STATES PATENT OFFICE.

JOSEPH D. INGRAM, OF AMARILLO, TEXAS.

WHEEL-TREAD.

1,372,951.  Specification of Letters Patent.   Patented Mar. 29, 1921.

Application filed November 3, 1919. Serial No. 335,255.

*To all whom it may concern:*

Be it known that I, JOSEPH DAN INGRAM, a citizen of the United States, residing at Amarillo, in the county of Potter and State of Texas, have invented a new and useful Wheel-Tread, of which the following is a specification.

This invention relates to wheel treads for tractors and the like and is especially designed as an improvement upon the structure disclosed in an application for patent filed by me on December 24th, 1918, Serial Number 268,152.

One of the objects of the invention is to provide a tread particularly adapted for use in connection with wheels or drums containing driving motors and such as disclosed in my copending application of even date herewith, the construction of the tread being such as to bring the ground engaging portions thereof close to the periphery of the wheel or drum, thus to strengthen and render more compact the entire structure.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention.

In the accompanying drawings the preferred form of the invention has been shown.

In said drawings—

Figure 1 is a side elevation of a portion of a wheel having the present improvements applied thereto.

Fig. 2 is a section on line 2—2, Fig. 1.

Fig. 3 is a section through a portion of the device on the line 3—3, Fig. 1.

Fig. 4 is a section on line 4—4, Fig. 3.

Referring to the figures by characters of reference, 1 designates the rim of a wheel to the inner surface of which are secured angle rings 2 located back from the edges of the rim as shown. Connected to the projecting side portions of the rim 1 and to the rings 2 are radially disposed brackets or guide strips 3 each of which is provided with an arm 4 extending at an angle therefrom and secured to its ring 2, as shown particularly in Fig. 1.

Pivotally connected to each ring 2 is an arcuate lever 5 having a long arm 6 and a short arm 7. A laterally offset outwardly extending ear 8 is provided at the end of the long arm 6 of the lever 5 and extends across and radially beyond the side edge of the wheel rim 1. An ogee-curved arm 9 extends inwardly from the free end of the lever arm 6 and is adapted to work within the arm 4 of bracket 3, it being understood that the arm 6 of the lever 5 projects between the bracket 3 and the ring 2 and is adapted to swing relative to the wheel and about the pivotal connection 10. The levers 5 are all regularly spaced as are also the brackets 3 and the end of the short arm 7 of each of said levers is connected by a spring 11 to the free end of the arm 9 of the next adjoining lever and which overlaps the said short arm 7. The connection between the spring 11 and arm 9 can be adjustable as shown at 12 whereby the tension of the spring can be regulated.

Each of the ears 8 projects into a yoke or saddle 13 and is pivotally connected thereto in any manner desired and as shown at 14. Oppositely extending arcuate wings 15 are provided at the inner side of every other saddle or yoke 13 and are lapped by oppositely extending similar arcuate wings 16 extending from the outer sides of the other saddles or yokes 13. A guide wheel or pulley 17 is carried by each of the arms 9 near its inner end and has a flexible member 18 mounted thereon and connected by springs 19 or the like to rods 20 which are fastened to the lapping wings 15 and 16 adjacent thereto.

The outer end of each wing 15 is connected by a tread strip 21 to the outer end of the corresponding wing 15 at the other side of the rim 1 and a similar tread strip 22 connects the outer end of each wing 16 with the outer end of the corresponding wing 16 at the other side of the wheel rim.

It will be apparent from the foregoing description that when the wheel is rotated forwardly or rearwardly the ends of the wings and the tread strips extending therefrom will engage the surface under the wheel and the various parts will assume the relative position illustrated in Fig. 1. For example as one of the strips 21 is pressed down upon the supporting surface during the rotation of the wheel it will be swung inwardly toward the wheel rim, thus causing the strip 21 at the other end of the same tread unit to swing outwardly toward and into contact with the supporting surface. At the same time the two strips 21 engaging the supporting surface will thrust upwardly against levers 5, this movement being retarded by the springs 11 connected to the arms 7 of the adjoining levers. As the wings 15 are swung downwardly toward the supporting surface, as described they will pull, through the rods 20, springs 19 and connections 18 upon the next adjoining wings 16 so as to cause them to swing inwardly toward the wheel rim and move the tread strip 22 at the other end of said tread unit outwardly toward and into contact with the supporting surface. Thus an automatic readjustment of the tread units is constantly taking place and the weight is distributed simultaneously upon several of them, thereby enabling the wheel to travel readily over the supporting surface with the same facility as an ordinary caterpillar tread, of the endless belt type.

What is claimed is:—

1. The combination with a wheel rim, of a wheel tread including a series of tread units each including oppositely extending wings and tread members connecting the corresponding wings of opposed units, the wings of each unit lapping and working relative to the wings of the adjoining units, levers pivotally engaged by the respective units and pivoted to and extending inward at the sides of the rim, yieldable connections between the levers for holding the units normally projected outwardly, and means for transmitting rocking motion from a wing of each unit to the next adjoining unit.

2. The combination with a wheel rim and guide members thereon at the sides thereof, of levers fulcrumed at the sides of the rim and adapted to swing within the guide members, a yieldable connection between one arm of each lever and the opposed arm of the next adjoining lever to hold one arm of each lever normally projected beyond the rim, tread units connected to and adapted to rock relative to the projecting portions of the levers, and yielding means for transmitting rocking movement from each unit to the next adjoining unit.

3. The combination with a wheel rim and guide members connected thereto at the sides thereof, of levers fulcrumed at the sides of the rim and having arms adapted to work within the guide members, a yieldable connection between one arm of each lever and the opposed arm of the next adjoining lever to hold one arm of each lever normally projected outwardly, a saddle pivotally connected to the projecting portion of each lever, opposed wings extending from each saddle and forming a tread unit, the wings of each unit lapping and being movable relative to the wings of the next adjoining units, tread members connecting the corresponding wings of opposed units and extending across the rim of the wheel, and means for transmitting swinging movement from each tread unit to the next adjoining units.

4. The combination with a wheel rim, of levers fulcrumed thereon at the sides thereof and having outwardly projecting portions, yielding connections between the levers for holding said projecting portions normally in their outermost positions, saddles pivotally connected to said projecting portions, oppositely extending wings upon each saddle and forming a tread unit, the wings of each unit lapping and being movable relative to the wings of the adjoining units, tread members connecting the corresponding wings of opposed units and extending across the tread, and means supported by the levers for transmitting pivotal movement from each unit to the next adjoining units.

5. The combination with a wheel rim, of levers fulcrumed at the sides thereof and having outwardly projecting portions, inwardly extending arms upon the levers, yielding connections between the levers and the inwardly extending portions of the next adjoining levers, for holding the projecting portions normally in outwardly extended positions, saddles connected to the said outwardly extended portions, oppositely extending wings upon each saddle and coöperating to form tread units, each unit lapping and being movable relative to the next adjoining units, connecting means between the wings of the opposed units, said means extending across the tread of the wheel rim, and means for transmitting swinging movement from each unit to the next adjoining units.

In testimony that I claim the foregoing as my own, I have hereto affixed my signature in the presence of two witnesses.

JOSEPH D. INGRAM.

Witnesses:
O. M. CHILDERS,
W. R. HARVEY.